United States Patent
Yamazaki et al.

(10) Patent No.: US 9,958,299 B2
(45) Date of Patent: May 1, 2018

(54) CABLE AND METHOD FOR INTRODUCING INITIAL TENSILE STRAIN TO OPTICAL FIBER

(71) Applicants: NIPPON STEEL & SUMIKIN ENGINEERING CO., LTD., Tokyo (JP); TOKYO ROPE MFG. CO., LTD., Tokyo (JP)

(72) Inventors: Shinsuke Yamazaki, Tokyo (JP); Yasuyuki Kai, Tokyo (JP); Junichi Ibukuro, Tokyo (JP); Satoru Kuramata, Tokyo (JP); Hiroki Sugiyama, Tokyo (JP)

(73) Assignees: NIPPON STEEL & SUMIKIN ENGINEERING CO., LTD., Tokyo (JP); TOKYO ROPE MFG. CO., LTD., Tokyo (JP)

( * ) Notice: Subject to any disclaimer, the term of this patent is extended or adjusted under 35 U.S.C. 154(b) by 0 days. days.

(21) Appl. No.: 15/522,192

(22) PCT Filed: Apr. 21, 2016

(86) PCT No.: PCT/JP2016/062611
§ 371 (c)(1),
(2) Date: Apr. 26, 2017

(87) PCT Pub. No.: WO2017/033494
PCT Pub. Date: Mar. 2, 2017

(65) Prior Publication Data
US 2017/0328743 A1   Nov. 16, 2017

(30) Foreign Application Priority Data
Aug. 27, 2015  (JP) ................ 2015-168268

(51) Int. Cl.
*G01D 5/353* (2006.01)
*E01D 19/16* (2006.01)
(Continued)

(52) U.S. Cl.
CPC ............. *G01D 5/353* (2013.01); *E01D 19/16* (2013.01); *G01L 1/24* (2013.01); *G01L 1/242* (2013.01);
(Continued)

(58) Field of Classification Search
None
See application file for complete search history.

(56) References Cited

U.S. PATENT DOCUMENTS

| 5,182,779 A | 1/1993 | D'Agostino et al. |
| 6,536,700 B2 * | 3/2003 | Watson ................ B65H 55/04 226/44 |

(Continued)

FOREIGN PATENT DOCUMENTS

| JP | 5-87007 U | 11/1993 |
| JP | 2001-296190 A | 10/2001 |

(Continued)

OTHER PUBLICATIONS

International Search Report for PCT/JP2016/062611 dated Jul. 26, 2016.
(Continued)

*Primary Examiner* — Tina Wong
(74) *Attorney, Agent, or Firm* — Birch, Stewart, Kolasch & Birch, LLP

(57) ABSTRACT

A cable (10) includes a cable body (11) that is formed from a plurality of wires (14) that are integrally bundled; and a pair of sockets (12) to which both end portions of the cable body (11) is separately affixed; at least one of the plurality of wires (14) being a fiber-containing wire (16), which is
(Continued)

formed by an optical fiber (17) that extends in a cable length direction (D) and that is protected by a protective tube (18); wherein the optical fiber (17) protrudes from the protective tube (18), in the cable length direction, further outside than the socket (12); and each of the pair of sockets (12) is provided with a spool (30) that removably holds the optical fiber (17) and imparts an initial tensile strain to the optical fiber (17).

6 Claims, 3 Drawing Sheets

(51) Int. Cl.
| | | |
|---|---|---|
| *G02B 6/44* | (2006.01) | |
| *G01L 1/24* | (2006.01) | |
| *G01L 5/04* | (2006.01) | |
| *B63B 21/50* | (2006.01) | |
| *B63B 35/44* | (2006.01) | |
| *E04B 7/14* | (2006.01) | |

(52) U.S. Cl.
CPC .............. *G01L 5/04* (2013.01); *G02B 6/44* (2013.01); *G02B 6/4433* (2013.01); *G02B 6/4457* (2013.01); *B63B 21/50* (2013.01); *B63B 2035/446* (2013.01); *E04B 7/14* (2013.01)

(56) References Cited

U.S. PATENT DOCUMENTS

| | | | |
|---|---|---|---|
| 6,554,217 B1 * | 4/2003 | Rodriguez | ............ B65H 54/58 242/362 |
| 6,873,893 B1 * | 3/2005 | Sanghera | ................ F41G 7/224 701/1 |
| 7,813,598 B2 * | 10/2010 | Mortensen | ........... G01M 11/086 385/12 |
| 9,000,990 B2 * | 4/2015 | Magid | ................... H01Q 1/087 343/715 |
| 9,680,279 B2 * | 6/2017 | Johnson | ................ H01S 3/0407 |
| 2004/0114850 A1 | 6/2004 | Dewyntermarty et al. | |
| 2014/0373636 A1 | 12/2014 | Yang | |
| 2015/0211900 A1 | 7/2015 | Xue et al. | |
| 2016/0072248 A1 * | 3/2016 | Johnson | ................ H01S 3/0407 385/135 |
| 2017/0328743 A1 * | 11/2017 | Yamazaki | ............... E01D 19/16 |

FOREIGN PATENT DOCUMENTS

| | | |
|---|---|---|
| JP | 2006-250647 A | 9/2006 |
| JP | 2007-297777 A | 11/2007 |
| JP | 2010-133871 A | 6/2010 |
| JP | 2012-523561 A | 10/2012 |
| JP | 2015-4672 A | 1/2015 |
| JP | 2015-501420 A | 1/2015 |
| WO | WO 2009/131893 A2 | 10/2009 |
| WO | WO 2010/117260 A1 | 10/2010 |
| WO | WO 2013/052543 A2 | 4/2013 |
| WO | WO 2014/027592 A1 | 2/2014 |
| WO | WO 2016/063904 A1 | 4/2016 |

OTHER PUBLICATIONS

Notice of Allowance for JP 2015-168268 dated Jan. 5, 2016.
Written Opinion of the International Searching Authority for PCT/JP2016/062611 (PCT/ISA/237) dated Jul. 26, 2016.

* cited by examiner

CABLE AND METHOD FOR INTRODUCING INITIAL TENSILE STRAIN TO OPTICAL FIBER

TECHNICAL FIELD

The present invention relates to a cable that can be favorably used, for example, as a structural cable of which both ends are separately affixed to a structure or to a foundation.

The present application claims priority based on Japanese Patent Application No. 2015-168268, filed in Japan on Aug. 27, 2015, the content of which is incorporated herein by reference.

BACKGROUND ART

Conventionally, cables comprising a cable body that is composed of a plurality of wires that are integrally bundled are known.

There are those, as described in the below-mentioned Patent Literature 1, wherein a fiber-containing wire, which is formed by an optical fiber that extends in the cable length direction and that is protected by a protective tube, is included as at least one of the plurality of wires in the above-mentioned cable.

RELATED LITERATURE

Patent Literature

[Patent Literature 1]
  JP 2007-297777 A

SUMMARY OF INVENTION

Technical Problem

However, the aforementioned conventional cable has room for improvement in terms of raising the strain detection capability and accuracy when using the optical fiber for strain detection.

The present invention was made in consideration of the aforementioned circumstances, and has the purpose of increasing the strain detection capability and accuracy of the optical fiber.

Solution to Problem

In order to solve the aforementioned problem, the present invention proposes the following means.

The cable according to the present invention comprises a cable body that is formed from a plurality of wires that are integrally bundled; and a pair of sockets to which both end portions of the cable body is separately affixed; at least one of the plurality of wires being a fiber-containing wire, which is formed by an optical fiber that extends in a cable length direction and that is protected by a protective tube; wherein the optical fiber protrudes from the protective tube, in the cable length direction, further outside than the socket; and each of the pair of sockets is provided with a tensile strain-imparting portion that holds the optical fiber and imparts an initial tensile strain to the optical fiber.

In this case, the tensile strain-imparting portion is capable of holding the optical fiber and imparting an initial tensile strain to the optical fiber. Therefore, when tension is applied to the cable body, the optical fiber can be expanded and contracted integrally with the cable body. As a result, the optical fiber can be precisely strained by the tension applied to the cable body.

Additionally, by releasing the hold that the tensile strain-imparting portion has on the optical fiber, the optical fiber can be withdrawn from the protective tube and removed from the cable.

The tensile strain-imparting portion may comprise a spool portion that holds the optical fiber by having the optical fiber wound about an outer circumferential surface of the spool portion.

In this case, by winding the optical fiber about the spool portion, the optical fiber can be easily held by the frictional force generated between the optical fiber and the outer circumferential surface of the spool portion. Furthermore, by changing the number of times that the optical fiber is wound about the spool portion, it is possible to easily adjust the frictional force generated between the optical fiber and the outer circumferential surface of the spool portion. Additionally, the hold on the optical fiber can be easily released by unwinding, from the spool portion, the optical fiber that has been wound about the spool portion.

The tensile strain-imparting portion may comprise fixing means for fixing the optical fiber to the spool portion; and the outer circumferential surface of the spool portion may be formed as a circular circumferential surface over which the optical fiber can slide in a circumferential direction of the spool portion.

In this case, due to the outer circumferential surface of the spool portion being a circular circumferential surface, the frictional force generated with respect to the spool portion by the optical fiber which is wound about the spool portion gradually increases in the circumferential direction. Therefore, when a force acts on the optical fiber in the tensile direction, localized stresses will not tend to occur in the optical fiber.

The spool portion may be formed so as to be able to rotate in a circumferential direction thereof, and may comprise rotation restricting means for restricting rotation in the circumferential direction.

In this case, an initial tensile strain can be introduced to the optical fiber by rotating the spool portion. Additionally, after the initial tensile strain is introduced, the effects due to rotation of the spool portion can be suppressed by restricting the rotation of the spool portion by the rotation restricting means, so that the state of introduction of the initial tensile strain to the optical fiber can be maintained.

A filler material that fills the socket so as to attach the end portions of the plurality of wires to the socket may be further provided, and the tensile strain-imparting portion may be held on the socket by the filler material.

In this case, when tension is applied to the cable body, the tensile strain-imparting portion will be displaced, along with the filler material, integrally with the end portion of the cable body. In contrast, if the tensile strain-imparting portion is held directly by the socket, the displacement of the tensile strain-imparting portion will be restricted by the socket when tension is applied to the cable body. Therefore, the optical fiber will be subjected to tension variations due to relative displacement with respect to the tensile strain-imparting portion, in addition to the tension variations in the cable body. Thus, the application, to the optical fiber, of components other than the tension variations in the cable body can be suppressed by directly holding the tensile strain-imparting portion by the filler material instead of the socket, thereby improving the cable tension detection accuracy.

The method for introducing an initial tensile strain to the optical fiber in accordance with the present invention is a method for introducing an initial tensile strain to the optical fiber in the cable as described above, comprising holding the optical fiber inserted through the protective tube by the tensile strain-imparting portion; and imparting t the initial tensile strain to the optical fiber via the tensile strain-imparting portion.

In this case, the introduction of an initial tensile strain to an optical fiber can be easily implemented during cable installation work, or during optical fiber replacement work in an installed cable.

Advantageous Effects of Invention

According to the cable of claim 1, the tensile strain-imparting portion holds the optical fiber and imparts an initial tensile strain to the optical fiber, so that when tension is applied to the cable body, the optical fiber can be expanded and contracted integrally with the cable body, so the optical fiber can be precisely strained on the basis of the tension applied to the cable body.

Additionally, by releasing the hold that the tensile strain-imparting portion has on the optical fiber, the optical fiber can be withdrawn from the protective tube and removed from the cable. As a result, the optical fiber can be conveniently replaced when the optical fiber has been damaged or the like.

According to the cable of claim 2, by winding the optical fiber about the spool portion, the optical fiber can be easily held by the frictional force generated between optical fiber and the outer circumferential surface of the spool portion. Therefore, in the case of a cable comprising fixing means for fixing the optical fiber in addition to a spool portion, the anchoring force applied to the optical fiber by the fixing means can be held low. As a result, when tension is applied to the cable body, the stress generated in a fixed portion of the optical fiber that is fixed to the fixing means can be made small, and the fixed portion can be made less susceptible to fatigue fracture or brittle fracture.

Additionally, the hold on the optical fiber can be easily released by unwinding, from the spool portion, the optical fiber that has been wound about the spool portion. As a result, the optical fiber can be conveniently replaced when the optical fiber has been damaged or the like.

According to the cable of claim 3, due to the outer circumferential surface of the spool portion being a circular circumferential surface, the frictional force generated with respect to the spool portion by the optical fiber which is wound about the spool portion gradually increases in the circumferential direction. Therefore, in the portion of the optical fiber that is drawn out from the spool portion, the frictional force gradually decreases, so that slips occur between the spool portion and the optical fiber in portions where the frictional force is low. Thus, when a force acts on the optical fiber in the tensile direction, localized stresses will not tend to occur in the optical fiber. As a result, it is possible to suppress damage or breakage of the optical fiber.

According to the cable of claim 4, an initial tensile strain can be introduced to the optical fiber by rotating the spool portion. Additionally, after the initial tensile strain is introduced, the state of introduction of the initial tensile strain to the optical fiber can be maintained by restricting the rotation of the spool portion by the rotation restriction means. As a result, the work required for introducing and adjusting the initial tensile strain in the optical fiber can be easily performed.

According to the cable in claim 5, when tension is applied to the cable body, the tensile strain-imparting portion is displaced, along with the filler material, integrally with the end portion of the cable body. Thus, it is possible to suppress the application, to the optical fiber, of components other than the tension variations in the cable body. As a result, the tension applied to the cable body can be measured with high accuracy on the basis of the changes in the strain in the optical fiber.

According to the method for introducing an initial tensile strain to the optical fiber in claim 6, the introduction of an initial tensile strain to an optical fiber can be easily implemented, for example, during cable manufacture in a factory, as well as during cable installation, when replacing the optical fiber in an installed cable, or the like. Therefore, it is possible to improve the work efficiency when installing a cable or replacing an optical fiber, and the work efficiency during calibration for detection of cable tension or the like.

DESCRIPTION OF EMBODIMENTS

Herebelow, a cable according to an embodiment of the present invention will be explained with reference to FIGS. 1 to 4. In FIG. 2 and FIG. 4, some of the wires 14 to be described below will be omitted from the illustration in order to make the drawings easier to see.

Figure 1:
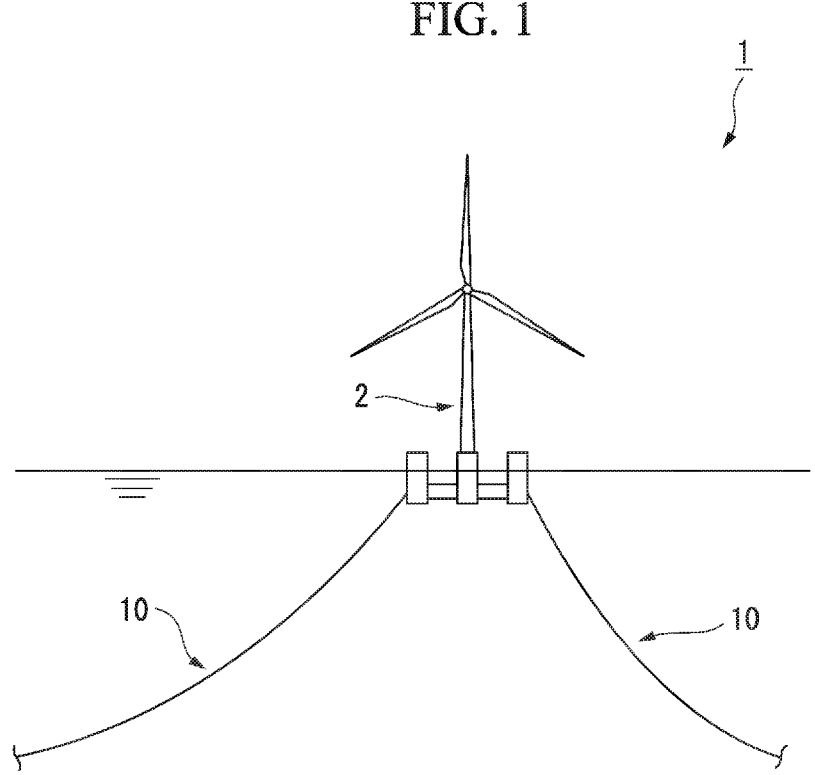
FIG. 1 is a schematic diagram illustrating a structure comprising a cable according to an embodiment of the present invention.
Figure 2:
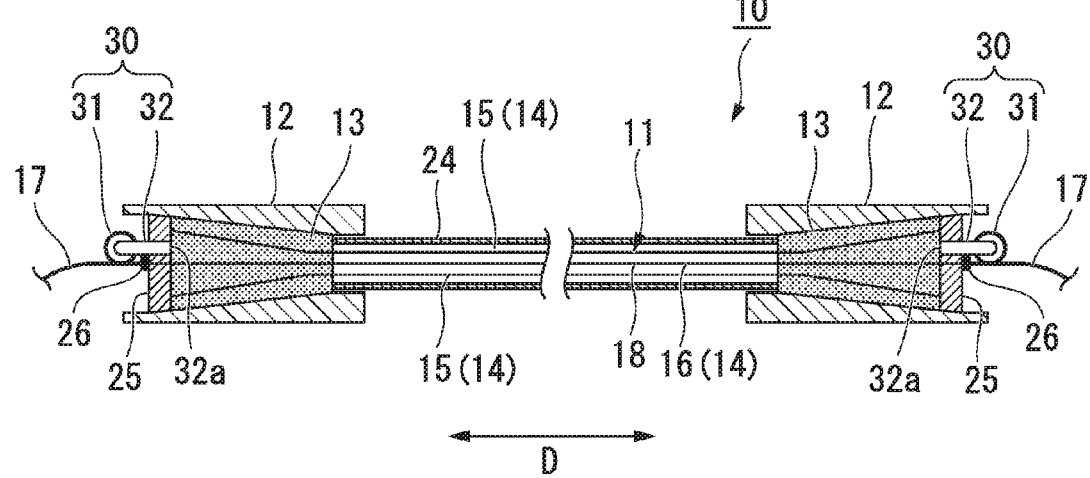
FIG. 2 is a longitudinal section view of the cable illustrated in FIG. 1.

As shown in FIG. 1, the cable 10 is used in a structure 1, and both ends of the cable 10 are separately affixed to a structure or a foundation. In the present embodiment, the cable 10 moors a float 2 (in the illustrated example, a floating power generation device), which is a structure, to an underwater bottom, not illustrated, which serves as a foundation. The cable 10 has one end affixed to the float 2 and the other end affixed to the underwater bottom. Tension is applied to this cable 10 when the float 2 is displaced on the water, so that the float 2, which is the structure, and the underwater bottom, which is the foundation, is displaced with respect to each other.

Figure 3:
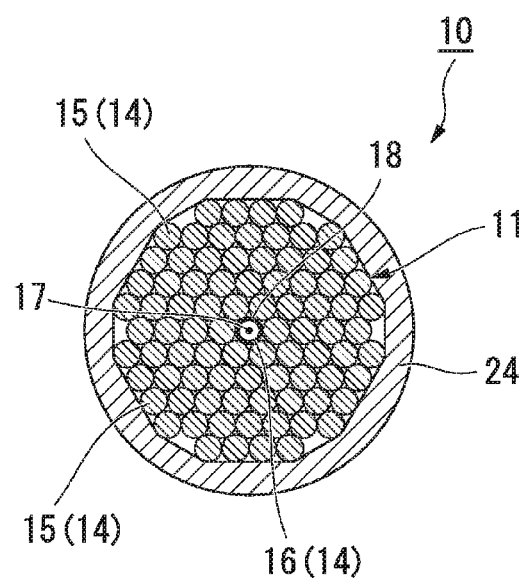
FIG. 3 is a transverse section view of the cable illustrated in FIG. 1.
Figure 4:
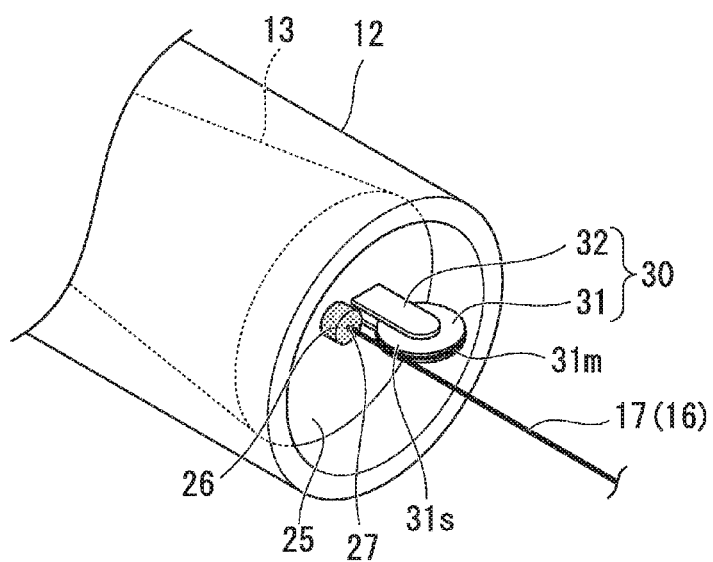
FIG. 4 is a perspective view of an end portion of the cable illustrated in FIG. 1.

As shown in FIG. 2 and FIG. 3, the cable 10 comprises a cable body 11, a pair of sockets 12 and a filler material 13.

The cable body 11 is formed from a plurality of wires 14 that are integrally bundled. The outer diameters of the plurality of wires 14 are equal to each other. The cable body 11 is an assembly (strand) comprising the plurality of wires 14. In the present embodiment, the cable body 11 is of the parallel wire strand (PWS) type.

The cable body 11 comprises, as the plurality of wires 14, steel wires 15 and a fiber-containing wire 16. In the present embodiment, a single fiber-containing wire 16 is provided. The fiber-containing wire 16 is disposed on the central axis of the cable body 11, and extends straight along the cable length direction D (see FIG. 2), which is the direction of this central axis.

The steel wires 15 are long, thin wires having a circular transverse cross section. As the steel wires 15, it is possible to use, for example, zinc-plated steel wires 15, which are steel wires having outer circumferential surfaces that are covered with zinc (Zn).

The fiber-containing wire 16 comprises an optical fiber 17 (optical transmission path) that extends in the cable length direction D, and a protective tube 18.

The optical fiber 17 is inserted into the protective tube 18. The optical fiber 17 is formed by covering, with a covering film, a fiber body having a core and a cladding.

The protective tube 18 forms the outer shell of the fiber-containing wire 16, and protects the optical fiber 17 inserted thereinside.

As shown in FIG. 2, in the cable body 11, a central portion that is positioned between the end portions in the cable length direction D is covered by a tubular covering layer 24. In this central portion, the plurality of wires 14 is bundled so as to be approximately parallel. On the other hand, the end portions of the cable body 11 in the cable length direction D are exposed from the covering layer 24. At these end portions, the plurality of wires 14 is untwisted.

The sockets 12 are separately affixed (anchored) to the aforementioned structure or the aforementioned foundation. The sockets 12 may be affixed to the structure or the foundation by employing, for example, a pin anchoring method, a method making use of bearing pressure, or the like.

Both end portions of the cable body 11 are separately inserted through sockets 12. The respective end portions of the plurality of wires 14 that are untwisted are disposed inside the sockets 12.

A filler material 13 attaches the end portions of the cable body 11 with the sockets 12. The filler material 13 fills the insides of the sockets 12, and in the illustrated example, fills a space, inside a socket 12, located to the inside of an anchoring plate 25, in the cable length direction D. The filler material 13 is formed, for example, by casting an alloy or a synthetic resin. Among the plurality of wires 14, in the fiber-containing wire 16, the tube end portion of the protective tube 18 is attached to the filler material 13.

Inside the socket 12, the anchoring plate 25 is provided so as to cover the filler material 13 from the outside in the cable length direction D. The anchoring plate 25 may be formed from a metal-based material, a resin-based material, a rubber-based material or the like. The anchoring plate 25 is formed in the shape of a disc, and is provided in a state free from the inner circumferential surface of the socket 12. In other words, a force that is applied to the anchoring plate 25 inward in the cable length direction D will be directly transmitted to the filler material 13, and will be transmitted to the socket 12 through the filler material 13.

The fiber-containing wire 16 is attached to the filler material 13, and the optical fiber 17 is exposed from an end portion 26 of the protective tube 18 that is exposed from the anchoring plate 25 to the outside. The end portion 26 is affixed to the anchoring plate 25. As shown in FIG. 2 and FIG. 4, the optical fiber 17 that is exposed form the end portion 26 of the protective tube 18 is passed through an aperture portion 27 (see FIG. 4) in the end portion 26, and protrudes further outside, in the cable length direction D, than the socket 12. The aperture portion 27 has an inner diameter that is greater than the outer diameter of the optical fiber 17, and the optical fiber 17 is able to move along the axial direction thereof with respect to the anchoring plate 25.

The optical fiber 17 that protrudes from the anchoring plate 25 to the outside in the cable length direction D is wound about a spool 30 (tensile strain-imparting portion), then guided out in an arbitrary direction.

The spool 30 has a disc-shaped spool body 31 (spool portion) and a base portion 32 that rotatably supports the spool body 31.

As shown in FIG. 4, the spool body 31 is formed so that the outer circumferential surface thereof is a circular circumferential surface over which the optical fiber 17 can slide in the circumferential direction. The optical fiber 17 is wound in a groove portion 31m formed in the outer circumferential surface of the spool body 31. The spool body 31 is arranged so that a point 31s in the circumferential direction of the outer circumferential portion thereof intersects with (is tangential with) a line of extension from the aperture portion 27. In other words, the optical fiber 17 which passes through and protrudes from the aperture portion 27 is wound about the spool body 31 from a tangential direction.

Additionally, the rotation of the spool body 31 can be restricted by an appropriate rotation restriction means which is not illustrated.

The optical fiber 17 is affixed to the spool body 31 by means of the frictional force generated with respect to the groove portion 31m, and fixing means, not illustrated, for fixing the optical fiber 17 to the spool body 31. In order to secure the frictional force between the optical fiber 17 and the spool body 31, and to suppress slipping of the optical fiber 17 with respect to the spool body 31, the optical fiber 17 may be wound about the spool body 31 multiple times (for example, two or three times). Additionally, if sufficient frictional force can be secured, then the optical fiber 17 may be draped over the spool body 31 and only wound by about one-half circuit around the spool body 31. As the fixing means, it is possible to use a friction plate that generates friction between the groove portion 31m and the optical fiber 17, or a self-adhesive tape, an adhesive agent or the like that affixes the optical fiber 17 to the spool body 31. These fixing means are preferably attached with a strength that allows for removal from the spool body 31, so that the optical fiber 17 can be easily released from fixation to the spool body 31 when the optical fiber 17 is to be replaced.

One end 32a of the base portion 32 is affixed to the anchoring plate 25. As a result, the spool 30 is held in the socket 12 by the anchoring plate 25 and the filler material 13, so that when the cable body 11 expands or contracts, the spool 30 moves integrally with the filler material 13.

When an initial tensile strain is to be introduced to the optical fiber 17 with such a structure, as illustrated in FIG. 1, in the cable 10, a prescribed initial tensile strain is introduced to the optical fiber 17 by rotating the spool body 31 on the spool 30 around which the optical fiber 17 has been wound.

After the introduction of the initial tensile strain has ended, the spool body 31 is constrained by a rotation restricting means (not illustrated).

In the cable 10 installed in this way, by connecting a measurement device, not illustrated, to the end portion of the optical fiber 17, a change in the strain in the optical fiber 17 associated with expansion or contraction of the cable body 11 is detected, so as to measure the tension applied to the cable body 11. As the measurement device, it is possible to employ, for example, a structure that detects the strain distribution in the optical fiber 17 by inputting light into the optical fiber 17 and detecting the reflected light, and that uses the strain distribution to determine the tension applied to the cable body 11. With such an optical fiber 17 used for strain measurement, the strain can be accurately measured by applying an initial tensile strain that is at least an appropriate amount higher than the tensile strain to be measured.

Additionally, the cable 10 is provided with a temperature-measuring optical fiber (not illustrated) in addition to the above-mentioned optical fiber 17. Since the strain detection in the above-mentioned optical fiber 17 is temperature-dependent, an optical fiber of the same type as the strain-detecting optical fiber 17 is provided for the purpose of measuring the temperature, and accuracy is ensured by using this optical fiber to correct for temperature. In the temperature-measuring optical fiber, the temperature is accurately measured by not applying tension and providing slack so as not to be affected by the tension variations in the cable 10.

As described above, according to the cable 10 of the present embodiment, the optical fiber 17 protrudes from the protective tube 18, in the cable length direction D, further outside than the socket 12, and a spool 30 that removably holds the optical fiber 17 and imparts an initial tensile strain to the optical fiber 17 is provided.

As a result, by being held by the spool 30 in a state of introduction of the prescribed initial tensile strain, the optical fiber 17 can be made to expand and contract integrally with the cable body 11 when tension is applied to the cable body 11. As a result, the optical fiber 17 can be precisely strained by the tension applied to the cable body 11. Therefore, the tension applied to the cable body 11 can be measured with high accuracy on the basis of the change in the strain on the optical fiber 17.

Additionally, if the hold on the optical fiber 17 at the spool 30 is released, the optical fiber 17 can be withdrawn from the protective tube 18, and removed from the cable 10. As a result, the optical fiber 17 can be conveniently replaced when the optical fiber 17 has been damaged or the like.

Additionally, the spool 30 comprises a spool body 31 that holds the optical fiber 17 by winding the optical fiber 17 around a groove portion 31*m*.

As a result, by winding the optical fiber 17 about the spool body 31, the optical fiber 17 can be easily held by the frictional force generated between optical fiber 17 and the groove portion 31*m* of the spool body 31. Therefore, in the case of a cable 10 comprising fixing means for fixing the optical fiber 17 in addition to the spool body 31, as in the present embodiment, the anchoring force applied to the optical fiber 17 by the fixing means can be held low. As a result, when tension is applied to the cable body 11, the stress generated in a fixed portion of the optical fiber 17 fixed to the fixing means can be made small, and the fixed portion can be made less susceptible to fatigue fracture or brittle fracture.

Additionally, the hold on the optical fiber 17 can be easily released by unwinding, from the spool body 31, the optical fiber 17 that has been wound about the spool body 31. As a result, the optical fiber 17 can be conveniently replaced when the optical fiber 17 has been damaged or the like.

Additionally, the groove portion 31*m* of the spool body 31 is formed so as to have a circular circumferential surface over which the optical fiber 17 can slide in the circumferential direction. Due to the groove portion 31*m* of the spool body 31 being a circular circumferential surface, the frictional force generated with respect to the spool body 31 by the optical fiber 17 which is wound about the spool body 31 from a tangential direction gradually increases in advancing along the circumferential direction from the tangent position. Thus, when a force acts on the optical fiber 17 in the tensile direction, localized stresses will not tend to occur in the optical fiber 17. As a result, it is possible to suppress damage or breakage of the optical fiber 17.

Additionally, the spool body 31 is formed so as to be able to rotate in the circumferential direction, and comprises rotation restriction means for restricting rotation in the circumferential direction. As a result, an initial tensile strain can be introduced to the optical fiber 17 by rotating the spool body 31. Additionally, after the initial tensile strain is introduced, the state of introduction of the initial tensile strain to the optical fiber 17 can be maintained by restricting the rotation of the spool body 31 by the rotation restriction means. As a result, the work required for introducing and adjusting the initial tensile strain in the optical fiber 17 can be easily performed.

Additionally, the spool 30 is held on the socket 12 by the filler material 13.

As a result, when tension is applied to the cable body 11, the spool 30 will be displaced, along with the filler material 13, integrally with the end portion of the cable body 11. In contrast, if the spool 30 is held directly by the socket 12, the displacement of the spool 30 will be restricted by the socket 12 when tension is applied to the cable body 11, so the optical fiber 17 will be subjected to tension variations due to relative displacement with respect to the spool 30 in addition to the tension variations in the cable body 11. Thus, the application, to the optical fiber 17, of components other than the tension variations in the cable body 11 can be suppressed by directly holding the spool 30 by the filler material 13 rather than the socket 12. As a result, the tension applied to the cable body 11 can be measured with high accuracy on the basis of the strain in the optical fiber 17.

Additionally, according to the method for introducing an initial tensile strain to the optical fiber 17 in the present embodiment, the optical fiber 17 that has been passed through the protective tube 18 can be held by the spool 30 to impart an initial tensile strain.

As a result, for example, the introduction of an initial tensile strain to the optical fiber 17 can be easily implemented, for example, during installation work for the cable 10, or during replacement work for the optical fiber 17 in an installed cable 10. Therefore, it is possible to improve the work efficiency when installing the cable 10 or replacing the optical fiber 17, and the work efficiency during calibration for detection of cable tension or the like.

The technical scope of the present invention is not limited to the foregoing embodiments, and various modifications can be made within a range not departing from the gist of the present invention.

In the aforementioned embodiments, just one of the plurality of wires 14 was a fiber-containing wire 16, but the present invention is not limited thereto. For example, two or more of the plurality of wires 14 may be fiber-containing wires 16. Additionally, in the present invention, a plurality of optical fibers may be inserted into a fiber-containing wire 16, and the plurality of optical fibers may be optical fibers that detect two or more different types of information. For example, one may be a temperature-measuring optical fiber, and the other may be a strain-measuring optical fiber. In that case, the plurality of optical fibers may be wound around a single spool 30, or may be wound around separately provided spools 30.

The anchoring plate 25 may be absent. In that case, the spool 30 may be directly attached to the filler material 13.

The measurement device may be configured so as to be capable of detecting two or more different types of information. For example, it may be configured to be able to detect both temperature and strain information.

The arrangement of the optical fiber 17 in the cable body 11 is not limited so as to be arranged on a concentric circle as indicated in the above-mentioned embodiment, and it is sufficient for at least one optical fiber 17 to be provided in the cable 10. Additionally, the structures of the optical fiber 17 and the fiber-containing wire 16, the principles of the measurement method and the like are not limited to those indicated in the above description, and various types can be applied.

The structure of the cable 10 is not limited to that of a parallel wire strand as explained in the above-described embodiments. For example, the steel wires 15 and the fiber-containing wire 16 forming the cable body 11 may be twisted together. Additionally, for example, the structure may be a multi-stranded structure, i.e. one wherein a plurality of cable bodies 11 as indicated in the embodiments or a plurality of cable bodies 11 formed by twisting together steel wires 15 and a fiber-containing wire 16 are further bundled to form a single cable. Furthermore, as a cable body 11, it is also possible to employ a structure wherein all or a part of the steel wire 15 is replaced with a wire formed from a fiber material (e.g., a carbon fiber or the like).

Additionally, in the aforementioned embodiment, the optical fiber 17 is simply inserted into the protective tube 18 and can be replaced, but the present invention is not limited thereto. For example, the optical fiber 17 may be irremovably fixed to the protective tube 18 by holding the optical fiber 17 by means of the spool 30 to introduce an initial strain, then filling the space between the optical fiber 17 and the protective tube 18 with a bonding agent (e.g., a resin material or the like).

Furthermore, the present invention is not limited to a cable 10 that is used to moor a float 2. For example, it may be a cable 10 for use in a suspension structure in a suspended roof structure in an architectural structure, or may be applied to a cable 10 used for a bridge such as a cable-stayed bridge, a suspension bridge or the like. Examples of bridges include those that are laid across rivers, straits, roads and the like.

In addition thereto, the elements in the aforementioned embodiments may be replaced, as appropriate, with other well-known elements, and the aforementioned modification examples may be combined, as appropriate, within a range not departing from the gist of the present invention.

REFERENCE SIGNS LIST

10 Cable
11 Cable body
12 Socket
13 Filler material
14 Wire
15 Steel wire
16 Fiber-containing wire
17 Optical fiber
18 Protective tube
30 Spool (tensile strain-imparting portion)
31 Spool body (spool portion)
31*m* Groove portion (outer circumferential surface)
D Cable length direction

The invention claimed is:

1. A cable comprising:
   a cable body that is formed from a plurality of wires that are integrally bundled; and
   a pair of sockets to which both end portions of the cable body is separately affixed;
   at least one of the plurality of wires being a fiber-containing wire, which is formed by an optical fiber that extends in a cable length direction and that is protected by a protective tube; wherein
   the optical fiber protrudes from the protective tube, in the cable length direction, further outside than the socket; and
   each of the pair of sockets is provided with a tensile strain-imparting portion that holds the optical fiber and imparts an initial tensile strain to the optical fiber.

2. The cable according to claim 1, wherein the tensile strain-imparting portion comprises a spool portion that holds the optical fiber by having the optical fiber wound about an outer circumferential surface of the spool portion.

3. The cable according to claim 2, wherein:
   the tensile strain-imparting portion comprises fixing means for fixing the optical fiber to the spool portion; and
   the outer circumferential surface of the spool portion is formed as a circular circumferential surface over which the optical fiber can slide in a circumferential direction of the spool portion.

4. The cable according to claim 2, wherein the spool portion is formed so as to be able to rotate in a circumferential direction thereof, and comprises rotation restricting means for restricting rotation in the circumferential direction.

5. The cable according to claim 1, further comprising:
   a filler material that fills the socket so as to attach the end portions of the plurality of wires to the socket;
   wherein the tensile strain-imparting portion is held on the socket by the filler material.

6. A method for introducing an initial tensile strain to the optical fiber in the cable according to claim 1, comprising:
   holding the optical fiber inserted through the protective tube by the tensile strain-imparting portion; and
   imparting the initial tensile strain to the optical fiber via the tensile strain-imparting portion.

* * * * *